M. GUTTORMSON.
MOLDBOARD.
APPLICATION FILED OCT. 4, 1915.
1,201,286.  Patented Oct. 17, 1916.
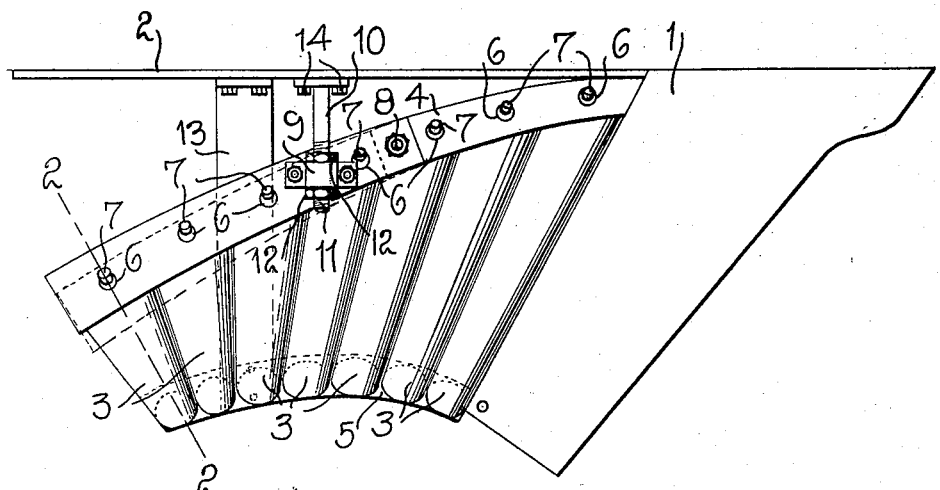
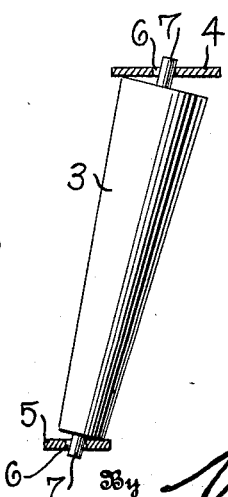
Inventor
MARTIN GUTTORMSON

UNITED STATES PATENT OFFICE.

MARTIN GUTTORMSON, OF VOLTAIRE, NORTH DAKOTA.

MOLDBOARD.

1,201,286. Specification of Letters Patent. Patented Oct. 17, 1916.

Application filed October 4, 1915. Serial No. 53,996.

*To all whom it may concern:*

Be it known that I, MARTIN GUTTORMSON, a citizen of the United States, residing at Voltaire, in the county of McHenry and State of North Dakota, have invented certain new and useful Improvements in Moldboards, of which the following is a specification, reference being had to the accompanying drawings.

This invention comprehends certain new and useful improvements in agricultural implements, and relates particularly to moldboards for plows.

The invention has for its primary object a durable and efficient construction of moldboard embodying a plurality of rollers, whereby draft resistance will be materially decreased as the plow passes through the soil, and the latter prevented from sticking to the mold-board, means being provided whereby the rollers may be raised or lowered, so as to render the implement adaptable, by a slight adjustment, for either breaking or plowing. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention reference is to be had to the following description and accompanying drawing, in which—

Figure 1 is a top plan view of my improved roller mold-board, and Fig. 2 is a detail section on the line 2—2 of Fig. 1.

Corresponding and like parts are referred to in the following description and designated in the views of the accompanying drawing by like reference characters.

Referring to the drawing, the numeral 1 designates the share of the plow and 2 the landside thereof.

In carrying out my invention, I provide any desired number of rollers 3, there being seven of these rollers shown in the present embodiment of the device, although it is to be understood that the invention is not limited to this or any other number. The rollers 3 are journaled in any desired way at their inner ends, that is, next to the landside, in a bar 4, and at their outer ends in a bar 5, said bars being provided with openings 6 in the present instance, for the reception of gudgeons or trunnions 7 that are formed on the ends of the rollers, each of said gudgeons or trunnions 7 being of a diameter materially less than the diameter of the coacting opening 6. Preferably, the rollers are tapered from their inner ends toward their outer ends, as clearly illustrated in the drawing, and they preferably decrease in length from the front toward the rear, whereby the bars 4 and 5 converge rearwardly, as is evident. The outer supporting bar 5 for the rollers is made of some yielding substance or material, preferably spring steel, while the inner bar is constructed in sections, but two sections being employed in the present instance, and said sections being pivotally connected together at their overlapping ends by a bolt 8 or the like, whereby the rear portions of the moldboard may be raised and lowered as required. To effect this adjustment, I preferably provide the rear section of the bar 4 with a bearing 9 through which a transversely extending rod 10 passes, said rod being secured in any desired way to the outer face of the landside and being threaded at its other end, as at 11, to the nuts 12, working on the threaded portion of said rod and contacting with the opposite faces of the bearing 9 to hold the parts at the required adjustment. The outer bar 5 is connected near its rear end to a transversely extending beam 13, by bolts or similar fastening devices, one end of said beam being secured by fastening devices 14 to the landside, as shown.

From the foregoing description, in connection with the accompanying drawing, the operation of my improved mold-board will be apparent. As the plow passes through the soil it is obvious that owing to the freely turning rollers 3, draft resistance is greatly decreased and the soil is prevented from sticking to the mold-board and by making the mold-board adjustable, as hereinbefore described, the implement is rendered adaptable, by a slight adjustment, to either breaking or plowing, as before specified.

While the accompanying drawing illustrates what I believe to be the preferred embodiment of my invention, it is to be understood that the invention is not limited thereto, but that various changes may be made in the construction, arrangements and proportions of the parts without departing from the scope of the invention, as defined in the appended claim.

What is claimed, is:

In combination with a plow share and a coacting landside, a mold board coacting with the share and consisting of an upper and lower supporting member, the upper supporting member being secured to the share substantially in vertical alinement with the mold board and the lower supporting member being secured to the lower portion of the rear of the share, said supporting members being arranged in differing vertical planes and disposed rearwardly and longitudinally in converging planes, the lower supporting member comprising a spring bar and the upper supporting member consisting of two sections having their adjacent extremities overlapping with the overlapping portions pivotally connected, openings produced in the supporting members, rollers interposed between the supporting members, said rollers being of varying lengths and having their opposite ends provided with trunnions directed through the openings of the supporting members, the diameters of the trunnions being materially less than the diameter of the openings through which they extend, and means carried by the landside and coacting with the outer pivoted section of the upper supporting member for moving said section in opposite directions relative to the landside whereby the interposed rollers coacting with said section may be raised or lowered.

In testimony whereof I hereunto affix my signature in the presence of two witnesses.

MARTIN GUTTORMSON.

Witnesses:
J. B. PALM,
JOHN G. PEDERSON.

Copies of this patent may be obtained for five cents each, by addressing the "Commissioner of Patents, Washington, D. C."